Patented Oct. 9, 1945

2,386,467

UNITED STATES PATENT OFFICE 2,386,467

ORGANO-SILICON POLYMERS AND METHOD OF MAKING THEM

James Franklin Hyde, Corning, N. Y., assignor to Corning Glass Works, Corning, N. Y., a corporation of New York No Drawing. Application August 11, 1944, Serial No. 549,137

14 Claims. (Cl. 260—2)

This invention relates to organo-silicon compounds and polymers thereof, and, more particularly, to methods of making them.

This application is a continuation-in-part of my copending applications Serial Number 318,373, filed February 10, 1940; Serial Number 353,302, filed August 19, 1940; and Serial Number 451,354, filed July 17, 1942, all assigned to the assignee of the present invention.

As is well known, there is no single material available which could meet all of the requirements of the numerous applications of resinous materials in industry. There is consequently a continual need for new resins or plastics, which are more suited to present applications or which may be adaptable to new applications that arise. By way of example; there has long been a need for a flexible electrical insulating medium which can be used in very thin layers and which will withstand relatively elevated temperatures without substantial deterioration in flexibility and electrical characteristics. Cotton, silk and paper fabrics decompose with charring at relatively low temperatures. Asbestos, which has the requisite temperature resistance for many electrical applications, must, because of its lack of mechanical strength, be employed in greater thickness than organic insulations. The recently developed fabrics of glass fibre on the other hand are thin and flexible and yet have a very high tensile strength and all the valuable electrical properties of glass. They will successively withstand temperatures above 500° C. without impairment of their electrical properties and up to about 350° C. without substantial loss of their original flexibility. Although the dielectric strength of glass per se is high, that of the fabric made therefrom is no higher than the dielectric strength of the air filling the voids and spaces between the fibres. Therefore, the use of an impregnating dielectric medium is essential for displacing the interstitial air. The temperature at which glass fabrics can be employed for electrical purposes has been limited by the relatively low decomposition temperatures of prior impregnating materials. Prior heat resisting resins become brittle and charred when subjected to temperatures in excess of about 150° C. The electrical characteristics of the impregnated fabric are thereby seriously impaired. The windings of motors, dynamos, transformers, electromagnets and other electrical equipment employing coils or covered conductors consequently have been objectionably bulky and they could not be built to operate efficiently at elevated temperatures. As will be seen, the properties of some of the new polymers make them especially valuable for electrical insulating purposes.

The primary object of this invention is the production of organic polymers which contain a large percentage of chemically combined silicon, are stable throughout a wide range of temperatures and vary in properties from liquids through rubbery flexible solids to hard brittle masses.

Another object of this invention is to provide a new process for polymerizing organo-silicon compounds which comprises heating them and concurrently subjecting them to air treatment.

Another object of this invention is to provide a new process for polymerizing organo-silicon compounds which comprises heating them and concurrently partially oxidizing them.

The new polymers are prepared by the hydrolysis and dehydration with heat of a disubstituted organo-silicon compound alone or in the presence of a mono-substituted organo-silicon compound. Various starting materials can be employed, such as silicon tetrachloride and ethyl orthosilicate. For economic reasons I prefer to use silicon tetrachloride and the following description shows by way of example the preparation of polymers therefrom. In general, the starting material is converted to a silicone having the general formula $(RR'SiO)_n$ where R is an alkyl or an aryl radical and R' is an alkyl radical. These silicones, as will later appear, are polymeric and have a heterocyclic structure consisting of a ring of alternate silicon and oxygen atoms with two organic radicals attached directly to each silicon atom through silicon-carbon linkages. I have found that by means of oxidation some of the alkyl radicals can be displaced by oxygen and a plurality of the heterocyclic groups can be joined by the silicon-oxygen-silicon linkages thus provided, thereby forming new and useful products of high stability.

As an example, the polymerization of phenyl ethyl silicone will be described. This compound may be prepared from silicon tetrachloride by a series of steps involving first the Grignard reaction:

(1)    $SiCl_4 + EtMgBr \rightarrow EtSiCl_3 + MgBrCl$ (2)    $EtSiCl_3 + PhMgBr \rightarrow PhEtSiCl_2 + MgBrCl$ In carrying out these reactions it is preferable to add the Grignard reagents slowly in order to maintain the silicon chloride in excess during the reaction, thereby discouraging the formation of trisubstituted and tetra-substituted compounds. After completion of each reaction the precipitated magnesium salts may be filtered out and the ether or other solvent in which the reaction was conducted may be separated by distillation. If desired, the product of each reaction may be further purified by fractional distillation under reduced pressure. However, it is advantageous to omit the intermediate purification and in fact the two reactions may be carried on simultaneously in the same reaction mixture provided the two Grignard reagents can be mixed without co-reaction, as in the present instance. The disubstituted silicon dichloride thus obtained may be purified by fractional distillation, but it is advantageous to use the crude product because for some purposes at least the presence of small amounts of other substitution products is unobjectionable and it has been found that the monosubstituted compound, if present, may beneficially take part in subsequent reactions, as will later appear. In order that the invention may be more clearly set forth, the reactions of the purified disubstituted material will first be considered.

The disubstituted silicon dichloride is converted to the corresponding silicane diol by hydrolysis and from this the silicone, sometimes called the anhydrosilicane diol, is formed by dehydration.

(3) $PhEtSiCl_2 + 2H_2O \rightarrow PhEtSi(OH)_2 + 2HCl$ (4) $2PhEtSi(OH)_2 \rightarrow 2PhEtSiO + H_2O$ The two reactions probably occur consecutively but appear to take place together. The reactions are carried out by slowly mixing an excess of water with the disubstituted silicon dichloride. The residual water and the hydrochloric acid formed during the reaction can be separated by means of a separatory funnel and, if desired, the last traces may be evaporated under vacuum.

In like manner a variety of silicones may be prepared containing various alkyl and/or aryl radicals including alkaryl radicals, heterocyclic radicals and other complex alkyl or aryl radicals which may be linked by a carbon atom to a silicon atom to form the silicone. In addition to the above described silicone I have also prepared in like manner dimethyl-, diethyl- and dibutyl-silicone. These, when treated by the methods to be described, undergo similar physical changes and yield polymerization products similar in structure to those obtained from phenyl ethyl silicone. It should be pointed out here that although the physical characteristics of the polymerization products appear to depend largely on structure and extent of polymerization, the nature of the groups does have some effect. Thus, at a certain advanced stage the products from alkyl silicones are quite flexible and rubbery, while those from diphenyl silicone, for example, at a similar stage are quite hard with a tendency to be brittle. The comparable product from phenyl ethyl silicone is intermediate. The silicones are in general either crystalline compounds or oily substances of varying viscosities at room temperature.

It is unlikely that the silicones can exist in a monomeric form, because there is no proof that a double bond can exist between silicon and oxygen. My researches show that the silicones here contemplated are heterocyclic and trimeric and have the general structural formula:

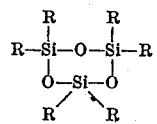

R being an alkyl or aryl radical including alkaryl and heterocyclic radicals, at least some radicals being alkyl radicals. For example, the trimer of phenyl ethyl silicone

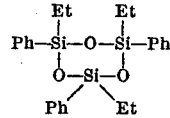

has a theoretical silica content of 40% and a molecular weight of 450. A sample of the product of Equation 3 above, from which the excess water and hydrochloric acid had been removed, was brought to constant weight under a vacuum at room temperature and the silica was determined by decomposition of the sample with a mixture of sulfuric and nitric acids followed by strong ignition of the residue. A silica content of 40.3% was obtained. A determination of the molecular weight of a similar dehydrated sample by the melting point method of K. Rast, as described in the book entitled "Quantitative Organic Microanalysis" by F. Pregl, 3rd edition Blackiston, page 237, yielded the result 445. Such close agreement between theory and experiment is strong evidence of the trimeric structure of the silicones.

Polymerization, as stated above, may be accomplished by the displacement of an organic radical from one or more of the silicon atoms of the trimeric heterocyclic group above referred to and the formation of oxygen linkages between silicon atoms of adjacent groups whereby two or more of the said groups are joined. Such polymerization results in stable compounds, the molecular weights and viscosities of which depend upon the extent of polymerization. The lower polymers, that is, those consisting of two or three of the said groups, are in general oily liquids and the higher polymers are increasingly viscous and resinous in character. In polymerizing the silicones, radicals may be displaced by oxidation with application of heat.

For example, in order to polymerize phenyl ethyl silicone by displacing alkyl radicals, I heat it at about 200°–300° C. and at the same time bubble air through it. The evolution of acetaldehyde indicates that ethyl radicals are being removed and that oxidation is taking place. The viscosity of the liquid increases, which indicates that the size of the molecules is increasing or, in other words, that a polymerization is occurring. With a silicone having the heterocyclic trimeric structure above referred to, the reaction may be represented as follows:

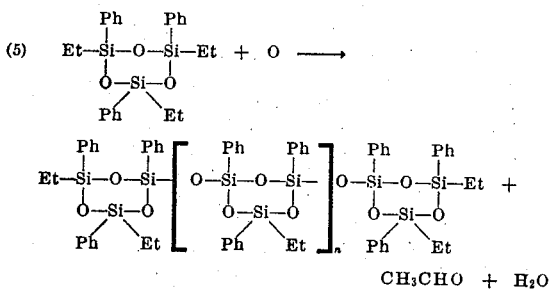

The viscosity further increases as the reaction is continued and at the end of several hours at the above noted temperatures the material has become highly viscous and sticky. At higher temperatures the reaction will proceed faster and less time may be required to attain high viscosity but appreciable loss by volatilization of the initial silicone may be incurred before polymerization can take place. When the material has attained the sticky, viscous stage, it is still soluble in toluene and like solvents, and is heat-convertible. Hence its molecular structure is believed to be largely at least of the chain type shown in Equation 5. If the viscous mass is further heated with access of air, it will harden to a flexible non-tacky resinous substance which is infusible and insoluble. Such change in properties is believed to be caused by the formation of cross linkages or side chains arising from the removal of ethyl groups from the sides of the chain structures of Equation 5 and the substitution of oxygen therefor, whereupon cross linkages of Si—O—Si to side chains occur. It is also possible that the change in properties is due to a closing of the chains to form cyclic polymers of high molecular weight. This is in accordance with the theory that open chain polymers are fusible and soluble and the introduction of cross chains results in infusibility and insolubility. In the above reaction for the removal of alkyl groups by oxidation, it is believed that the aryl groups are substantially unaffected. Alkyl groups may also be removed by other oxidizing reagents.

Another method of removing both alkyl and aryl radicals simultaneously is to treat the silicone with nitric acid. The acid removes alkyl radicals by oxidation and at the same time removes aryl radicals by nitration, nitrobenzene being evolved as a by-product.

When ethyl orthosilicate is used as a starting material, the procedure outlined above for silicon tetrachloride is used and the reactions which occur are similar to those noted for the latter material.

Dialkyl silicon compounds are also prepared by the foregoing methods. For example, when dimethyl-diethoxy silicon is hydrolyzed with an excess of water and air is bubbled through the resulting silicone while the latter is heated at about 200°–250° C., a viscous, soluble, heat-convertible product is obtained which, on continued heating, is converted to an insoluble, infusible but flexible resinous substance. Hydrolysis and dehydration take place as follows:

(6) 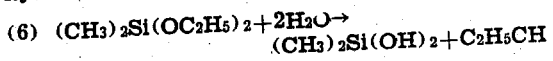
$\quad\quad\quad$ (CH$_3$)$_2$Si(OH)$_2$+C$_2$H$_5$CH (7) 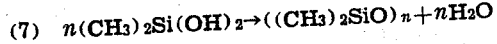

The reaction according to Equation 7, to some extent at least, occurs simultaneously with the reaction represented in Equation 6 and further condensation and dehydration of the silicol takes place upon the application of heat to produce the silicone as a liquid having the above described heterocyclic structure comprising groups of alternate silicon and oxygen atoms. When air is passed through the heated silicone, some of the methyl radicals are oxidized to formaldehyde and replaced with oxygen atoms which form siloxane linkages between heterocyclic groups, thus:

(8) 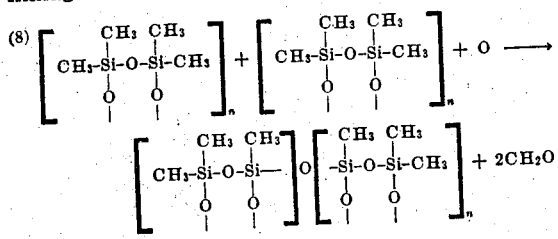

In addition to the alkyl containing silicon compounds already mentioned as having been polymerized by air treatment, I have also polymerized in the same manner phenyl methyl silicone, phenyl benzyl silicone, di-butyl silicone, diethyl silicone, diamyl silicone, dibenzyl silicone and benzyl methyl silicone. Phenyl methyl diethoxy silicane was also successfully polymerized in like manner by heating it at elevated temperatures, preferably in the neighborhood of 200° C., while passing either wet or dry air therethrough until an increase in viscosity was produced.

The stage at which the material is highly viscous and sticky but is still soluble in toluene and other solvents is believed to mark the approximate limit to which polymerization with chain structure can be carried and the approximate point at which extensive formation of cross linkages begins. Hence, if it is desired to obtain the largest possible molecules while retaining solubility and heat-convertible characteristics, it is necessary to continue the polymerizing treatment as long as possible without causing the product to become insoluble. The progress of the polymerization may be readily observed by removing a small portion of the product with a glass rod from time to time as the polymerization proceeds and cooling it and observing its characteristics and solubility. It is characteristic of the new compounds in the sticky, viscous yet soluble state representing the approximate limit of chain polymerization that they are substantially free from objectionable flow at temperatures suitable for curing when applied in solution for coating or impregnation.

The experimental results of analysis and molecular weight determination indicate that the structure of the new compounds at the soluble, heat-convertible stage in their polymerization consists of molecular chains comprising an average of four of the trimeric heterocyclic groups above referred to and that the average value of $n$ in Equation 5 is at least 2. As pointed out above, the subsequent further polymerization results in a probable increase in the size of the molecule through the inclusion therein of additional trimeric heterocyclic groups. The determination of the molecular weight of the final insoluble resin would be extremely difficult, if not impossible, and hence the number of such groups comprising the final resin cannot be stated but is at least four.

By conducting the polymerization for shorter lengths of time than that required to produce the tetra-cyclic polymer described above, bi-cyclic and tri-cyclic polymers consisting on an average of two and three of the heterocyclic groups respectively can be produced. Viscosity measurements made periodically during the polymerization of phenyl ethyl silicone up to the tetra-cyclic stage when plotted against time gave a smooth curve. This indicates that the viscosity does not change abruptly with the transition of the material from the bi-cyclic to the tri-cyclic or from the tri-cyclic to the tetra-cyclic polymer. Consequently the viscosity cannot be used as an accurate indication of the exclusive presence of either of the lower polymers. However, polymerization can be stopped at any intermediate stage and the products thereof are useful viscous liquids, which correspond to the lower stages of polymerization as regards average molecular weight and silica content.

In the above described processes for producing the new compositions from disubstituted organosilicon compounds, some of the radicals are removed leaving the product to some extent monosubstituted. I have found that when a mixture of mono- and di-substituted silicon chlorides is hydrolyzed copolymerization may occur, and in some instances with the proper proportions resins similar in behavior and properties to those from the corresponding pure disubstituted silicon compounds have resulted.

The compositions produced by the above described air-blowing process may be used for various purposes. The liquids which have not reached the heat-convertible stage are useful as waterproofing agents on glass, as hydraulic and damping fluids, etc. The heat-convertible resinous liquids are excellent coating and impregnating agents, particularly in the fabrication of electrically insulating materials, because in their liquid form they can be dissolved and applied in the form of solutions for the impregnation of various fibrous materials and thereafter can be polymerized to complete insolubility and infusibility. In the latter state they have rubber-like characteristics and good electrical properties at room temperature, all of which are retained at temperatures above those at which prior resins break down and deteriorate. The new resins are relatively non-flammable and do not leave a carbonaceous residue when decomposed.

In making use of the new resins for impregnating tapes and other fibrous materials for electrical insulation the polymerization is carried out until the material has attained the sticky, viscous state just short of insolubility, after which it is cooled and dissolved in toluene or other solvent. The solution is applied by dipping, brushing or spraying, followed by evaporation of the solvent. Several applications of the solution may be required to produce a coating of sufficient thickness. When the solvent has completely evaporated the coated article is baked for several hours at a temperature from 200–300° C. until the resin is tack-free. With the phenylethyl silicon resin this condition is attained by baking for about 36 hours while the temperature is slowly raised from about 200° C. to about 260° C. Other silicon resins within the scope of my invention may require different temperatures and times, but such conditions are readily determined by trial.

Comparative tests have shown that at normal temperatures the above described resins are equally as good as the average of prior resins and impregnating media with respect to flexibility and electrical characteristics in general and are superior with respect to power factor loss. At higher temperatures the new resins are superior in that they retain their flexibility and electrical properties long after the prior materials have failed.

The new resins adhere well to glass under both dry and wet conditions. It was found, therefore, that the impregnation of glass fiber yarn with the new resins increases the flexing endurance of the yarn manyfold. In performing the test, the yarn was flexed over a freely rotatable steel mandrel one-eighth inch in diameter at a tension of three-fourths of a pound. Breakage of the yarn constituted failure. The test was performed first by using dry yarn and then by pouring water on the yarn while flexing it over the mandrel. With dry, untreated yarn from 700 to 1000 flexes could be obtained, but, when wet with water, the untreated yarn withstood only 30 to 40 flexes before failure. When the yarn was previously impregnated with the phenylethyl silicon resin from 2000 to 3000 dry flexes and from 650 to 1200 wet flexes were obtained before failure. When the yarn was impregnated with dimethyl silicon resin, 1600 to 1700 dry flexes and 600 to 800 wet flexes were obtained.

The high degree of flexibility of the new resins when properly cured, and their ability to retain their flexibility and electrical properties at temperatures above 200° C. for extended periods of time makes them particularly suitable as coatings per se on wire in lieu of the prior enamels and varnishes employed for coating magnet wire and the like.

I claim:
1. In the method of increasing the viscosity of a polymeric liquid organo-silicon oxide composition which consists essentially of silicon atoms, oxygen atoms and monovalent hydrocarbon radicals selected from the class consisting of alkyl, aryl and alkaryl radicals, at least some of said radicals being alkyl radicals, said silicon atoms being joined together by said oxygen atoms through silicon-oxygen linkages and said hydrocarbon radicals being attached to said silicon atoms by carbon-silicon linkages, there being on the average from approximately one to approximately two hydrocarbon radicals per silicon atom, the step comprising passing oxygen through the mass of said organo-silicon liquid at a temperature between about 200 and 300° C. until an increase in its viscosity is obtained.

2. In the method of increasing the viscosity of a polymeric liquid organo-silicon composition which consists essentially of silicon atoms, oxygen atoms and monovalent hydrocarbon radicals selected from the class consisting of alkyl, aryl and alkaryl radicals, at least some of said radicals being alkyl radicals, said silicon atoms being joined together by said oxygen atoms through silicon-oxygen linkages and said hydrocarbon radicals being attached to said silicon atoms by carbon-silicon linkages, there being on the average from approximately one to approximately two hydrocarbon radicals per silicon atom, the step comprising passing air through the mass of said organo-silicon liquid at a temperature between about 200 and 300° C., until an increase in its viscosity is obtained.

3. The method according to claim 2 wherein the organo-silicon liquid is substantially free of hydroxyl groups prior to said air treatment.

4. The method according to claim 2 wherein the hydrocarbon radicals consist of lower alkyl radicals.

5. The method according to claim 2 wherein the hydrocarbon radicals consist of lower alkyl radicals and phenyl radicals.

6. In the method of increasing the viscosity of a polymeric liquid organo-silicon composition which consists essentially of silicon atoms, oxygen atoms and monovalent hydrocarbon radicals selected from the class consisting of alkyl, aryl and alkaryl radicals, at least some of said radicals being alkyl radicals, said silicon atoms being joined together by said oxygen atoms through silicon-oxygen linkages and said hydrocarbon radicals being attached to said silicon atoms by carbon-silicon linkages, there being on the average from approximately one to approximately two hydrocarbon radicals per silicon atom, the step comprising passing oxygen through the mass of said organo-silicon liquid at a temperature between about 200 and 300° C. until the liquid becomes heat-convertible, resinous, tacky and of such high viscosity that it exhibits slight flow at the temperature of the air treatment but is still soluble in toluene.

7. In the method of increasing the viscosity of a polymeric liquid organo-silicon composition which consists essentially of silicon atoms, oxygen atoms and monovalent hydrocarbon radicals selected from the class consisting of alkyl, aryl and alkaryl radicals, at least some of said radicals being alkyl radicals, said silicon atoms being joined together by said oxygen atoms through silicon-oxygen linkages and said hydrocarbon radicals being attached to said silicon atoms by carbon-silicon linkages, there being on the average from approximately one to approximately two hydrocarbon radicals per silicon atom, the step comprising passing air through the mass of said organo-silicon liquid at a temperature between about 200 and 300° C. until the liquid becomes heat-convertible, resinous, tacky and of such high viscosity that it exhibits slight flow at the temperature of the air treatment but is still soluble in toluene.

8. The method according to claim 7 wherein the organo-silicon liquid is substantially free of hydroxyl groups prior to said air treatment.

9. The method according to claim 7 wherein the average number of hydrocarbon radicals per silicon atom of the starting composition is approximately two.

10. The method according to claim 7 wherein the organo-silicon liquid consists essentially of recurring structural units having the formula $RR_1SiO$, where R represents a lower alkyl radical and $R_1$ represents a phenyl radical.

11. The method according to claim 7 wherein the organo-silicon liquid consists essentially of recurring structural units having the formula $R_2SiO$, where R represents a lower alkyl radical.

12. The method according to claim 7 wherein the organo-silicon liquid consists essentially of recurring structural units having the formula $(C_2H_5)_2SiO$.

13. The method according to claim 7 wherein the organo-silicon liquid consists essentially of recurring structural units having the formula $(C_6H_5)(C_2H_5)SiO$.

14. The method according to claim 7 wherein the organo-silicon liquid consists essentially of recurring structural units having the formula $(CH_3)_2SiO$.

JAMES FRANKLIN HYDE.